United States Patent
Andrew

(10) Patent No.: US 6,351,568 B1
(45) Date of Patent: Feb. 26, 2002

(54) IMAGE TRANSFORM AND SIGNIFICANCE BIT-PLANE COMPRESSION AND DECOMPRESSION

(75) Inventor: James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/178,701

(22) Filed: Oct. 26, 1998

(30) Foreign Application Priority Data

Mar. 20, 1998 (AU) .............................. PP2484

(51) Int. Cl.[7] .............................. G06K 9/36; G06K 9/46
(52) U.S. Cl. .................... 382/239; 358/430; 358/433; 382/239; 382/250
(58) Field of Search ................. 341/51; 348/395.1, 348/403.1, 404.1, 408.1, 420.1; 358/261.2, 430, 432, 433; 375/240.02, 240.18, 240.2, 240.24, 240.25; 382/232, 233, 239, 240, 248, 250

(56) References Cited

U.S. PATENT DOCUMENTS

| | | | |
|---|---|---|---|
| 5,163,103 A | * 11/1992 | Uetani | 382/250 |
| 5,748,116 A | 5/1998 | Chui et al. | 341/50 |
| 5,748,786 A | * 5/1998 | Zandi et al. | 382/240 |
| 5,805,293 A | * 9/1998 | Mochizuki | 382/248 |
| 5,991,816 A | * 11/1999 | Percival et al. | 382/240 |
| 6,058,215 A | * 5/2000 | Schwartz et al. | 382/250 |
| 6,163,626 A | 12/2000 | Andrew | 382/240 |

* cited by examiner

Primary Examiner—Timothy M. Johnson
(74) Attorney, Agent, or Firm—Fitzpatrick, Cella, Harper & Scinto

(57) ABSTRACT

A method of representing a digital image to provide a coded representation is disclosed. The digital image is divided into a number of blocks of pixels and each block is transformed to derive a block of transform coefficients, each transform coefficient being represented by a predefined bit sequence. Each block of transform coefficients is selected in turn as a region and a predetermined maximum bit plane is set as the current bit plane. This is followed by scanning the significances of each bitplane of the selected region from the current bitplane towards a predetermined minimum bitplane, and providing a first token for each insignificant bitplane and a second token for a significant bitplane in the code representation until a significant bitplane is determined and the determined significant bitplane is set as the current bitplane. The selected region is partitioned into two or more subregions having a predetermined form, and setting each of the subregions as the selected region. These steps are repeated for each selected region in turn, commencing from the current bit plane until the predetermined minimum bitplane has been reached, or the selected region has a predetermined size, and coding the transform coefficients of the selected region and providing the coded transform coefficients in the coded representation.

13 Claims, 8 Drawing Sheets

IMAGE TRANSFORM AND SIGNIFICANCE BIT-PLANE COMPRESSION AND DECOMPRESSION

FIELD OF THE INVENTION

The present invention relates to a method and apparatus for encoding and decoding digital images including transcoding to and from other compression formats. The present invention is not limited to still image technologies and may also be used in video image technologies.

BACKGROUND ART

The JPEG compression standard is a widely used image compression method, particularly in its baseline JPEG mode. There are many other modes of JPEG, some of which offer greater compression, but such modes are usually more complex than baseline JPEG. JPEG has many desirable features, not the least of which is the substantially separate coding of 8×8 blocks of pixels. This means that only 8×8 blocks of pixels need to be buffered in memory (or possibly 8 lines of pixels in a hardware implementation). This low memory buffering requirement leads to relatively inexpensive hardware solutions and fast software execution speed.

There is a new generation of image compression methods, generally based on the wavelet transform, that offer improved compression performance over JPEG. However, these new methods generally have much larger memory buffering requirements.

It is an object of the present invention to provide an alternate image compression method.

SUMMARY OF THE INVENTION

One or more exemplary aspects of the invention are listed below, but are not limited thereto.

According to one aspect of the invention there is provided a method of representing a digital image to provide a coded representation, said method including the steps of:

(a) dividing said digital image into a number of blocks of pixels;

(b) transforming each block of pixels to derive a block of transform coefficients, each transform coefficient represented by a predefined bit sequence;

(c) selecting each block of transform coefficients in turn as a region and setting a predetermined maximum bit plane as the current bit plane;

(d) scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined significant bitplane as the current bitplane;

(e) partitioning said selected region into two or more subregions having a predetermined form, and setting each of said subregions as said selected region;

(f) repeating steps (d) and (e) for each selected region in turn, commencing from said current bit plane until the predetermined minimum bitplane has been reached, or said selected region has a predetermined size, and coding said transform coefficients of said selected region and providing said coded transform coefficients in said coded representation.

According to another aspect of the invention there is provided an apparatus for representing a digital image to provide a coded representation, said apparatus including:

means for dividing said digital image into a number of blocks of pixels, means for transforming each block of pixels to derive a block of transform coefficients, each coefficient represented by a predefined bit sequence;

means for selecting each block of transform coefficients in turn as a region and setting a predetermined maximum bitplane as the current bitplane;

means for scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined bitplane as the current bitplane;

means for partitioning said selected region into two or more subregions having a predetermined form and setting each of said subregions as said selected region;

means for controlling said scanning means and said partitioning means to carry out respective functioning of said scanning and partitioning means commencing from said current bitplane until the predetermined minimum bitplane has been reached, or said selected region has a predetermined size, and for coding said transform coefficients of said selected region and providing said coded transform coefficients in said coded representation.

According to still another aspect of the invention there is provided a computer program product including a computer readable medium having recorded thereon a computer program for representing a digital image to provide a coded representation, said computer program product including:

means for dividing said digital image into a number of blocks of pixels, means for transforming each block of pixels to derive a block of transform coefficients, each coefficient represented by a predefined bit sequence;

means for selecting each block of transform coefficients in turn as a region and setting a predetermined maximum bitplane as current bitplane;

means for scanning the significance of each bitplane of said selected region from said current bitplane towards a predetermined minimum bitplane, and providing a first token for each insignificant bitplane and a second token for a significant bitplane in said coded representation until significant bitplane is determined and setting said determined bitplane as the current bitplane;

means for partitioning said selected region into two or more subregions having a predetermining form, and setting each of said subregions as said selected region;

means for controlling said scanning means and said partitioning means to carry out respective functioning of said scanning and partitioning means commencing from said current bitplane until the predetermined minimum bitplane has been reached, or said selected region has a predetermined size, and for coding said transform coefficients of said selected region and providing said coded transform coefficients in said coded representation.

According to still another aspect of the invention there is provide a method for decoding a coded representation of a digital image consisting of a number of blocks of pixels having associated therewith blocks of transform coefficients, said method including the steps of:

(a) selecting each block of transform coefficients as a region;

(b) scanning said coded representation associated with said selected region, said coded representation including a first token for each insignificant bitplane of said coefficients, a second token for each significant bitplane of said coefficients, and zero or more coded coefficients;

(c) if a first token is determined, providing an insignificant bitplane in an output stream for a current bitplane of coefficients of said selected region;

(d) if a second token is determined, provided a significant bitplane in said output stream for said current bitplane of said coefficients of said selected region and partitioning said selected region into two or more subregions having a predetermined form, and setting each of said subregions as said selected region;

(e) repeating steps (b) to (d) commencing from a predetermined bitplane until a predetermined minimum bit plane has been reached, or until said selected region has a predetermined size wherein a coded transform coefficient of said selected region is decoded and provided in an output block of transform coefficients;

(f) inverse transforming each said output block of transform coefficients to derive a said block of pixels; and (g) combining said blocks of pixels to reconstitute the digital image.

According to still another aspect of the invention there is provided an apparatus for decoding a coded representation of a digital image consisting of a number of blocks of pixels having associated therewith blocks of transform coefficients, said apparatus including:

means for selecting each block of transform of coefficients as a region;

means for scanning said coded representation of said selected region, said coded representation including a first token for each insignificant bitplane of said coefficients, a second token for each significant bitplane of said coefficients, and zero or more coded coefficients;

means for, if a first token is determined, providing an insignificant bitplane in an output stream for a current bitplane of coefficients of said selected region;

means for, if a second token is determined, providing a significant bitplane in said output stream for said current bitplane of said coefficients of said selected region and partitioning said selected region into two or more subregions having a predetermined form, and setting each of said subregions as said selected region;

means for controlling said scanning means, said means for providing said insignificant bitplane, and means for providing said significant bitplane commencing from a predetermined bitplane until a predetermined minimum bit plane has been reached, or until said selected region has a predetermined size wherein a coded coefficient of said selected region is decoded and provided in said output stream.

means for inverse transforming each said output block of transform coefficients to derive a said block of pixels; and means for combining said blocks of pixels to reconstitute the digital image.

According to still another aspect of the invention there is provided a computer program product including a computer readable medium having recorded thereon a computer program for decoding a coded representation of a digital image, said computer program product comprising:

means for selecting each block of transform coefficients as a region;

means for scanning said coded representation of said selected region, said coded representation including a first token for each insignificant bitplane of said coefficients, a second token for each significant bitplane of said coefficients, and zero or more coded coefficients;

means for, if a first token is determined, providing an insignificant bitplane in an output stream for a current bitplane of coefficients of said selected region;

means for, if a second token is determined, providing a significant bitplane in said output stream for said current bitplane of said coefficients of said selected region and partitioning said selected region into two or more subregions having a predetermined form, and setting each of said subregions as said selected region;

means for controlling said scanning means, said means for providing said insignificant bitplane, and said means for providing said significant bitplane commencing from a predetermined bitplane until a predetermined minimum bit plane has been reached, or until said selected region has a predetermined size wherein a coded coefficient of said selected region is decoded and provided in said output stream;

means for inverse transforming each said output block of transform coefficients to derive a said block of pixels; and means for combining said blocks of pixels to reconstitute the digital image.

According to still another aspect of the invention there is provided a method of transcoding a JPEG encoded digital image to provide a coded representation in another format; said method including the following steps:

(a) entropy decoding the JPEG digital image to generate blocks of quantised transform coefficients;

(b) selecting each block of transform coefficients in turn as a region and setting a predetermined maximum bit plane as the current bit plane;

(c) scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined significant bitplane as the current bitplane;

(d) partitioning said selected region into two or more subregions having a predetermined form, and setting each of said subregions as said selected region;

(e) repeating steps (c) and (d) for each selected region in turn, commencing from said current bit plane until the predetermined minimum bitplane has been reached, or said selected region has a predetermined size, and coding said transform coefficients of said selected region and providing said coded transform coefficients in said coded representation.

According to still another aspect of the invention there is provided an apparatus for transcoding a JPEG encoded digital image to provide a coded representation in another format; said apparatus including;

means from entropy decoding the JPEG digital image to generate blocks of quantised transform coefficients;

means for selecting each block of transform coefficients in turn as a region and setting a predetermined maximum bitplane as the current bitplane;

means for scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined bitplane as the current bitplane;

means for partitioning said selected region into two or more subregions having a predetermined form, and setting each of said subregions as said selected region:

means for controlling said scanning means and said partitioning means to carry out respective functioning of said scanning and partitioning means commencing from said current bitplane until the predetermined minimum bitplane has been reached, or said selected region has a predetermined size, and for coding said transform coefficients of said selected region and providing said coded transform coefficients in said coded representation.

According to still another aspect of the invention there is provided a computer program product including a computer readable medium having recorded thereon a computer program for transcoding a JPEG encoded digital image to provide a coded representation in another format; said computer program product including;

means for entropy decoding the JPEG digital image to generate blocks of quantised transform coefficients;

means for selecting each block of transform coefficients in turn as a region and setting a predetermined maximum bitplane as the current bitplane;

means for scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined bitplane as the current bitplane;

means for partitioning said selected region into two or more subregions having a predetermined form, and setting each of said subregions as said selected region;

means for controlling said scanning means and said partitioning means to carry out respective functioning of said scanning and partitioning means commencing from said current bitplane until the predetermined minimum bitplane has been reached, or said selected region has a predetermined size, and for coding said transform coefficients of said selected region and providing said coded transform coefficients in said coded representation.

According to still another aspect of the invention there is provided a method of transcoding a coded representation of a digital image consisting of a number of blocks of pixels having associated therewith blocks of transform coefficients to a JPEG encoded image; said method including the following steps;

(a) selecting a block of transform coefficients as a region;

(b) scanning said coded representation associated with said selected region, said coded representation including a first token for each insignificant bitplane of said coefficients, a second token for each significant bitplane of said coefficients, and zero or more coded coefficients:

(c) if a first token is determined, providing an insignificant bitplane in an output stream for a current bitplane of coefficients of said selected region:

(d) if a second token is determined, providing a significant bitplane in said output stream for said current bitplane of said coefficients of said selected region and partitioning said selected region into two or more subregions having a predetermined form, and setting each of said subregions as said selected region;

(e) repeating steps (b) and (d) commencing from a predetermined bitplane until a predetermined minimum bit plane has been reached, or until said selected region has a predetermined size wherein a coded transform coefficient of said selected region is decoded and provided in an output block of transform coefficients;

(f) entropy coding each said output block of transform coefficients to derive said JPEG encoded image.

According to still another aspect of the invention there is provided an apparatus for transcoding a coded representation of a digital image consisting of a number of blocks of pixels having associated therewith blocks of transform coefficients to a JPEG encoded image; said apparatus including;

means for selecting a block of transform coefficients as a region;

means for scanning said coded representation associated with said selected region, said coded representation including a first token for each insignificant bitplane of said coefficients, a second token for each significant bitplane of said coefficients, and zero or more coded coefficients;

means for, if a first token is determined, providing an insignificant bitplane in an output stream for a current bitplane of coefficients of said selected region;

means for, if a second token is determined, providing a significant bitplane in said output stream for said current bitplane of said coefficients of said selected region and partitioning said selected region into two or more subregions having a predetermined form, and setting each of said subregions as said selected region;

means for controlling said scanning means, said means for providing said insignificant bitplane, and said means for providing said significant bitplane commencing from a predetermined bitplane until a predetermined minimum bit plane has been reached, or until said selected region has a predetermined size wherein a coded coefficient of said selected region is decoded and provided in said output steam; and means for entropy coding each said output block of transform coefficients to derive said JPEG encoded image. According to still another aspect of the invention there is provided a computer program product including a computer readable medium having recorded thereon a computer program for transcoding a coded representation of a digital image consisting of a number of blocks of pixels having associated therewith blocks of transform coefficients to a JPEG encoded image; said computer program product including;

means for selecting a block of transform coefficients as a region;

means for scanning said coded representation associated with said selected region, said coded representation including a first token for each insignificant bitplane of said coefficients, a second token for each significant bitplane of said coefficients, and zero or more coded coefficients;

means for, if a first token is determined, providing an insignificant bitplane in an output stream for a current bitplane of coefficients of said selected region;

means for, if a second token is determined, providing a significant bitplane in said output stream for said current bitplane of said coefficients of said selected region and partitioning said selected region into two or more subregions having a predetermined form, and setting each of said subregions as said selected region; means for controlling said scanning means, said means for providing said insignificant bitplane, and said means for providing said significant bitplane commencing from a predetermined bitplane until a predetermined minimum bit plane has been reached, or until said selected region has a predetermined size wherein a coded coefficient of said selected region is decoded and provided in said output stream; and means for entropy coding each said output block of transform coefficients to derive said JPEG encoded image.

According to still another aspect of the invention there is provided a method of representing a digital image to provide a coded binary representation, said method including steps of:

(a) dividing said digital image into a number of blocks of pixels;

(b) transforming each block of pixels to derive a block of transform coefficients, each transform coefficient represented by a predefined bit sequence;

(c) selecting each block of transform coefficients in turn as a region and setting a predetermined significant bit plane as the current bit plane;

(d) scanning the significance of each bitplane of said selected region from the current bit plane towards a predetermined minimum bitplane, and providing a first token for each insignificant bitplane and a second token for a significant bitplane in said coded binary representation until a significant bitplane is determined and setting said determined significant bit plane as the current bit plane;

(e) partitioning said selected region into two or more subregions having a predetermined form, and setting each of said subregions as said selected region;

(f) repeating steps (d) and (e) for each selected region in turn, commencing from said current bit plane until the predetermined minimum bit plane has been reached, or said selected region has only one transform coefficient and in the event of the latter coding said one transform coefficient by performing the following steps;

(i) summing the magnitude of said one transform coefficient and $_2$minBitNumber (ii) outputting a bit sequence from currentBitNumber to minBitNumber inclusive of said sum, if by doing so the most significant bit of said sum does not exceed the currentBitNumber, otherwise outputting a bit sequence from the currentBitNumber to the minBitNumber inclusive of said one transform coefficient, wherein the minimum bit plane has a bit number minBitNumber which is an integer greater than zero and the current bitplane has a bit number currentBitNumber.

BRIEF DESCRIPTION OF THE DRAWINGS

Embodiments of the invention are described with reference to the drawings, in which.

DETAILED DESCRIPTION

Overview

Figure 1:
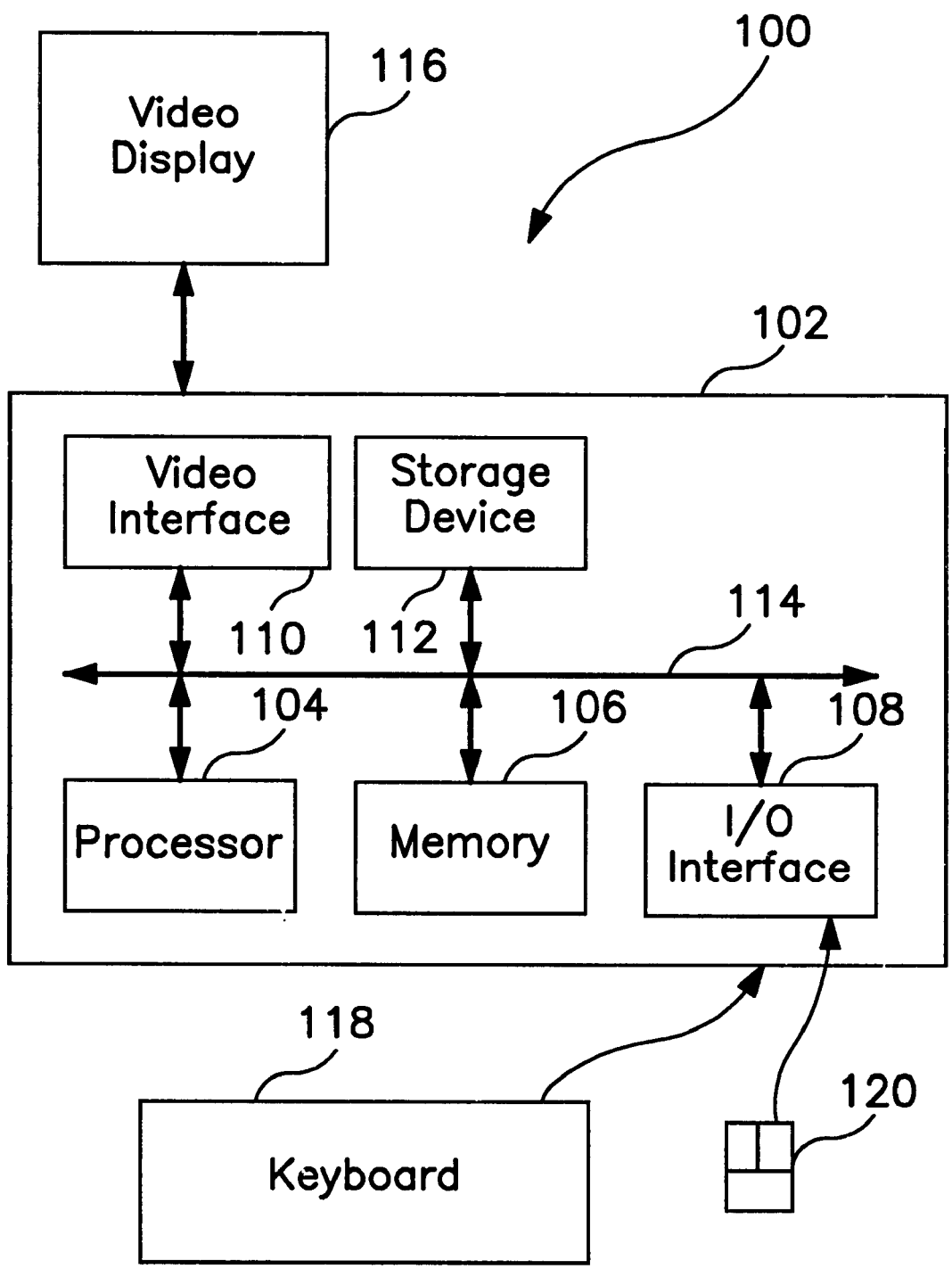
FIG. 1 is a block diagram of a general purpose computer with which the embodiments can be implemented.

The embodiments of the invention can preferably be practiced using a conventional general-purpose computer, such as the one shown in FIG. 1, wherein the processes of FIGS. 2 to 10 are implemented as software executing on the computer. In particular, the steps of the coding and/or decoding methods are effected by instructions in the software that are carried out by the computer. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding digital images and decoding coded representations of digital images in accordance with the embodiments of the invention. A system may be practiced for coding a digital image and decoding the corresponding coded representation of the image, or vice versa.

The computer system 100 consists of the computer 102, a video display 116, and input devices 118, 120. In addition, the computer system 100 can have any of a number of other output devices including line printers, laser printers, plotters, and other reproduction devices connected to the computer 102. The computer system 100 can be connected to one or more other computers using an appropriate communication channel such as a modem communications path, a computer network, or the like. The computer network may include a local area network (LAN), a wide area network (WAN), an Intranet, and/or the Internet.

The computer 102 itself consists of a central processing unit(s) (simply referred to as a processor hereinafter) 104, a memory 106 which may include random access memory (RAM) and read-only memory (ROM), an input/output (IO) interface 108, a video interface 110, and one or more storage devices generally represented by a block 112 in FIG. 1. The storage device(s) 112 can consist of one or more of the following: a floppy disc, a hard disc drive, a magneto-optical disc drive, CD-ROM, magnetic tape or any other of a number of non-volatile storage devices well known to those skilled in the art. Each of the components 104 to 112 is typically connected to one or more of the other devices via a bus 114 that in turn can consist of data, address, and control buses.

The video interface 110 is connected to the video display 116 and provides video signals from the computer 102 for display on the video display 116. User input to operate the computer 102 can be provided by one or more input devices. For example, an operator can use the keyboard 118 and/or a pointing device such as the mouse 120 to provide input to the computer 102.

The system 100 is simply provided for illustrative purposes and other configurations can be employed without departing from the scope and spirit of the inventions. Exemplary computers on which the embodiment can be practiced include IBM-PC/ATs or compatibles, one of the Macintosh (TM) family of PCs, Sun Sparcstation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 112 in FIG. 1) as the computer readable medium, and read and controlled using the processor 104. Intermediate storage of the program and pixel data and any data fetched from the network may be accomplished using the semiconductor memory 106, possibly in concert with the hard disk drive 112.

In some instances, the program may be supplied to the user encoded on a CD-ROM or a floppy disk (both generally depicted by block 112), or alternatively could be read by the user from the network via a modem device connected to the computer, for example. Still, further, the software can also be loaded into the computer system 100 from other computer readable medium including magnetic tape, a ROM or integrated circuit, a magneto-optical disk, a radio or infrared transmission channel between the computer and another device, a computer readable card such as PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The embodiments of the invention may alternatively be implemented in dedicated hardware such as integrated circuits. Such dedicated hardware may in addition include one or microprocessors and associated memories.

Before proceeding with a further description of the embodiments, a brief review of terminology used hereinafter is provided. For a binary integer representation of a number, "bit n" or "bit number n" refers to the binary digit n places to the left of the least significant bit (beginning with bit 0). For example, assuming an 8-bit binary representation, the decimal number 9 is represented as 00001001. In this number, bit 3 is equal to 1, while bits 2, 1, and 0 are equal to 0, 0, and 1, respectively. A transform may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three dimensional space which passes through each bit sequence at the same bitnumber is called a bitplane.

Figure 2:
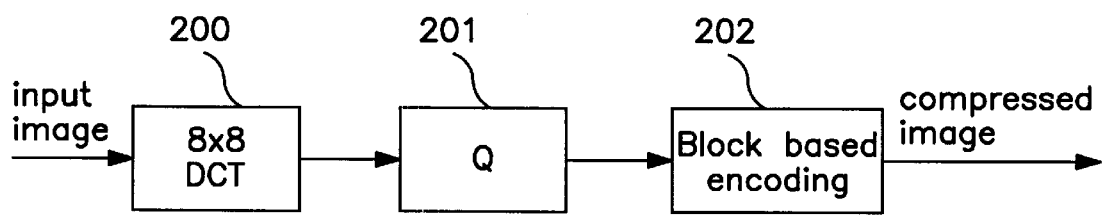
FIG. 2 is a flow diagram illustrating a method of encoding, an image according to a preferred embodiment.

FIG. 2 shows a flow diagram of an encoding method for encoding an digital image to an compressed digital image in accordance with one embodiment of the invention. In this compression process, the original digital image is divided into 8×8 blocks of pixels, which blocks are then sequentially fed to the input of a 8×8 two dimensional discrete cosine transform (DCT) transformer 200. The transformer 200 generates 8×8 blocks of DCT coefficients, in the same manner as the JPEG baseline standard. In one embodiment, each DCT coefficient is quantised by a quantiser 201 according to the JPEG baseline standard. The JPEG baseline method of quantisation together with other alternative embodiments of quantisation are described in more detail in the sections entitled "Quantisation Methods" and "Further Alterntive Quantisation Methods". The blocks are then sequentially fed to the encoder 202 where the quantised DCT coefficients of each 8×8 block are encoded. As in the JPEG baseline standard, the quantised DC coefficient of a block is encoded as the difference from the DC term of the previous block in the encoding order. The block encoding 200 of DCT coefficients is described in more detail in the section entitled "Block Coding of DCT Coefficients". Still further, entropy coding (eg. binary arithmetic coding) may be optionally used in conjunction with the above mentioned encoding process. That is, the above-described encoding process may be followed by a step of entropy encoding the encoded stream. If so, the decoding step described below with reference to FIG. 3 may be preceded by an entropy decoding step for decoding the entropy coded stream. The encoding method shown in FIG. 2 is very similar to JPEG baseline compression apparatus. However, the encoding method described herein uses a different method to losslessly encode the quantised DCT coefficients.

Figure 3:
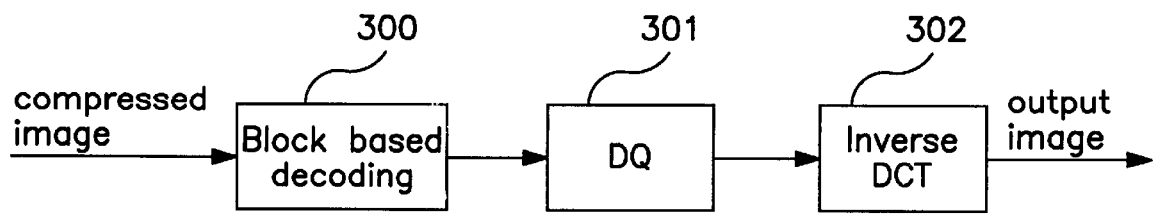
FIG. 3 is a flow diagram illustrating a method of decoding, an image according to a preferred embodiment.

FIG. 3 shows a flow diagram of the decoding method of a compressed digital image to the original digital image, where the compressed digital image has been encoded by the encoding method shown in FIG. 2. The decoding process is simply the reverse of this encoding process shown in FIG. 2. The encoded bitstream is fed to a decoder 300, which decodes the bitstream to generate 8×8blocks of quantised DCT coefficients. This block decoding 300 is described in more detail in the section entitled "Block Decoding of DCT coefficients". The 8×8 blocks of quantised coefficients are then fed to a dequantiser 301, where each coefficient is then dequantised. In one embodiment, each quantised DCT coefficient is dequantised according to the JPEG baseline standard. The JPEG baseline method of dequantisation together with other alternative embodiments of dequantisation are described in more detail in the sections entitled "Quantisation Methods" and "Further Alternative Quantisation Methods". Finally each 8×8 block is transformed with an inverse 8×8 two dimensional DCT transformer 302 and the resulting image blocks are combined to reconstitute the original image, or some approximation thereof.

Figure 4:
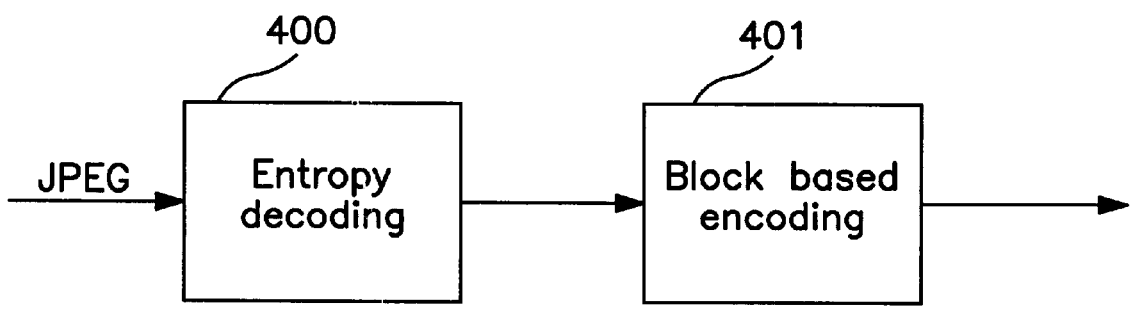
FIG. 4 is a flow diagram illustrating a method of transcoding a JPEG baseline encoded image to an encoded image, where the later can be decoded by the method shown in FIG. 3.

FIG. 4 shows a flow diagram of a transcoding method from a JPEG baseline compressed digital image to an compressed digital image, where the later can be decoded to the original image by the method shown in FIG. 3. In this transcoding process, a JPEG baseline compressed image bitstream is fed to an entropy decoder 400, which decodes the bitstream in the same manner as an entropy decoder utilized in the JPEG decompression process. In this way, the decoder 400 outputs 8×8 blocks of quantised DCT coefficients. These 8×8 blocks of quantised DCT coefficients are then sequentially fed to an encoder 401, where the quantised DCT coefficients of each 8×8 block are encoded. This block coding 401 of DCT coefficients is described in more detail in the section "Block Coding of DCT Coefficients". In this way, the transcoder converts JPEG baseline compressed images to compressed digital images which can be decoded by the method shown in FIG. 3. Still further, entropy coding (eg. binary arithmetic coding) may be optionally used in conjunction with the transcoding process. That is, the above-described transcoding process may be followed by a step of entropy encoding the encoded stream. If so, the transcoding process described below may be preceded by an entropy decoding step for decoding the entropy coded stream.

Figure 5:
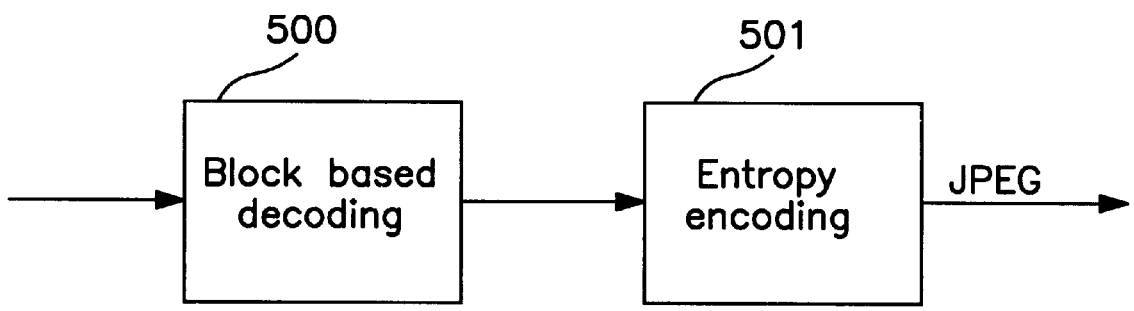
FIG. 5 is a flow diagram illustrating a method of transcoding an encoded image, encoded by the method shown in FIG. 2, to a JPEG baseline encoded image

FIG. 5 shows a flow diagram of a transcoding process from an compressed digital image, encoded by the method shown in FIG. 2, to a JPEG baseline compressed digital image. In this transcoding process, the compressed image bitstream encoded by the method shown in FIG. 2, is fed to a decoder 500. The decoder 500 decodes the bitstream to generate 8×8 blocks of quantised DCT coefficients. This block decoding 500 of DCT coefficients is described in more detail in the section entitled "Block Coding of DCT Coefficients". The 8×8 blocks of quantised DCT coefficients are then fed to an entropy encoder 501, which encodes the blocks in the same manner as an entropy encoder utilized in JPEG baseline compression. In this way, the transcoder converts images, compressed by the method shown in FIG. 2, to JPEG baseline compressed images.

As the encoding and decoding processes of 400,401,500 and 501 are lossless, then it is possible to transcode from the JPEG baseline standard to the compression format described herein and vice versa without loss. The later feature is desirable since JPEG is such a widely used standard, both in software and in devices such as printers and copiers. Moreover, an improved form of quantisation utilized in the block coding of the DCT Coefficients provides a better rate distortion performance and offers no loss in transcoding to a JPEG format.

The 2 Dimensional Discrete Cosine Transform (DCT)

In both the JPEG baseline standard and the encoding method described herein (FIG. 2), each 8×8 block of the input image is transformed using two dimensional discrete cosine transform (200), generating an 8×8 block of transform coefficients. Similarly in both the JPEG baseline standard and the decoding method described herein (FIG. 3), transforming the 8×8 block of transform coefficients with a two dimensional inverse discrete cosine transform (302) gives the original 8×8 block.

Quantisation

First Embodiment of Quantisation The quantisation employed by the quantiser (200) in this embodiment is the same as in the baseline JPEG standard. That is each coefficient is uniformly quantised with a quantisation step size determined by a quantisation matrix. If the step size is Q a coefficient x is quantised by dividing x by Q and then rounding to the nearest integer. The quantised value is thus, $$q = sgn(x)\left\lfloor \frac{|x|}{Q} + 0.5 \right\rfloor \quad (1)$$

where $\lfloor y \rfloor$ is the largest smaller than or equal to y and.

$$sgn(x) = \begin{cases} -1 & x < 0 \\ 0 & x = 0 \\ 1 & x > 0 \end{cases}$$

The dequantised value is, $$X \times Qq \quad (2)$$

The dequantiser 301 has knowledge of Q for each DCT coefficient and dequantises each quantised coefficient according to equation (2). Second Embodiment of Quantisation The quantisation employed by the quantiser 200 in this embodiment uses uniform quantisation with a deadzone (that is twice the size of the quantisation step size) as follows. That is, given a step size Q a coefficient x is quantised as, $$q = sgn(x)\left\lfloor \frac{|x|}{Q} \right\rfloor \quad (3)$$

$$sgn(x) = \begin{cases} -1 & x < 0 \\ 0 & x = 0 \\ 1 & x > 0 \end{cases}$$

The dequantisation, or inverse quantisation employed by the dequantiser 301, is given by, $$\hat{x} = Qq + sgn(q)\frac{Q}{2} \quad (4)$$

Uniform quantisation with a deadzone generally offers better rate-distortion performance than simple uniform quantisation for image compression. In the section entitled "Further Alternate Quantisation Methods", a further variant on uniform quantisation with a deadzone is described which offers even better rate distortion performance.

Block Coding of DCT coefficients

For discrete cosine transform coding applications, the number of bits per coefficient required to represent the possible range of coefficients is determined by the resolution of each pixel (in bits per pixel) in the input image. This range of values for each pixel is typically large relative to the values of most of the transform coefficients, and thus many coefficients have a large number of leading zeros. For example, the number 9 has four leading zeros in and 8-bit representation and has 12 leading zeros in a 16-bit representation. The encoding method and apparatus in accordance with the present embodiment provide a way of representing (or coding) these leading zeros, for blocks of coefficients, in any efficient manner. The remaining bits and sign of the number may be encoded directly without modification.

To simplify the description and not to obscure unnecessarily the invention, the discrete cosine transform coefficients are assumed hereinafter to be represented in an unsigned binary integer form, with a single sign bit. That is, the decimal number —9 and 9 are represented with the same bit sequence, namely 1001, with the former having a sign bit equal to 1 to indicate a negative value, and the latter having a sign bit equal to 0 to indicate a positive value. The number of leading zeros is determined by the range of the transform coefficients. In using an integer representation, the coefficients are simplicity already quantised to the nearest integer value. Thus, for the purpose of compression, any information contained in fractional bits is normally ignored.

A block consists of a set of contiguous image coefficients, eg an 8×8 discrete cosine transform (DCT) block. The term coefficient is used hereinafter interchangeably with pixel, however, as will be well understood by a person skilled in the art, the former is typically used to refer to pixels in a transform domain (eg., a DCT domain).

The coding process shown in FIG. 2 is hereinafter described in more detail with reference to FIGS. 6 and 7. The processes illustrated in the flow diagrams of FIGS. 6 and 7 may be implemented using software executing on a general-purpose computer, such as that of FIG. 1, or alternatively using dedicated hardware.

Figure 6:
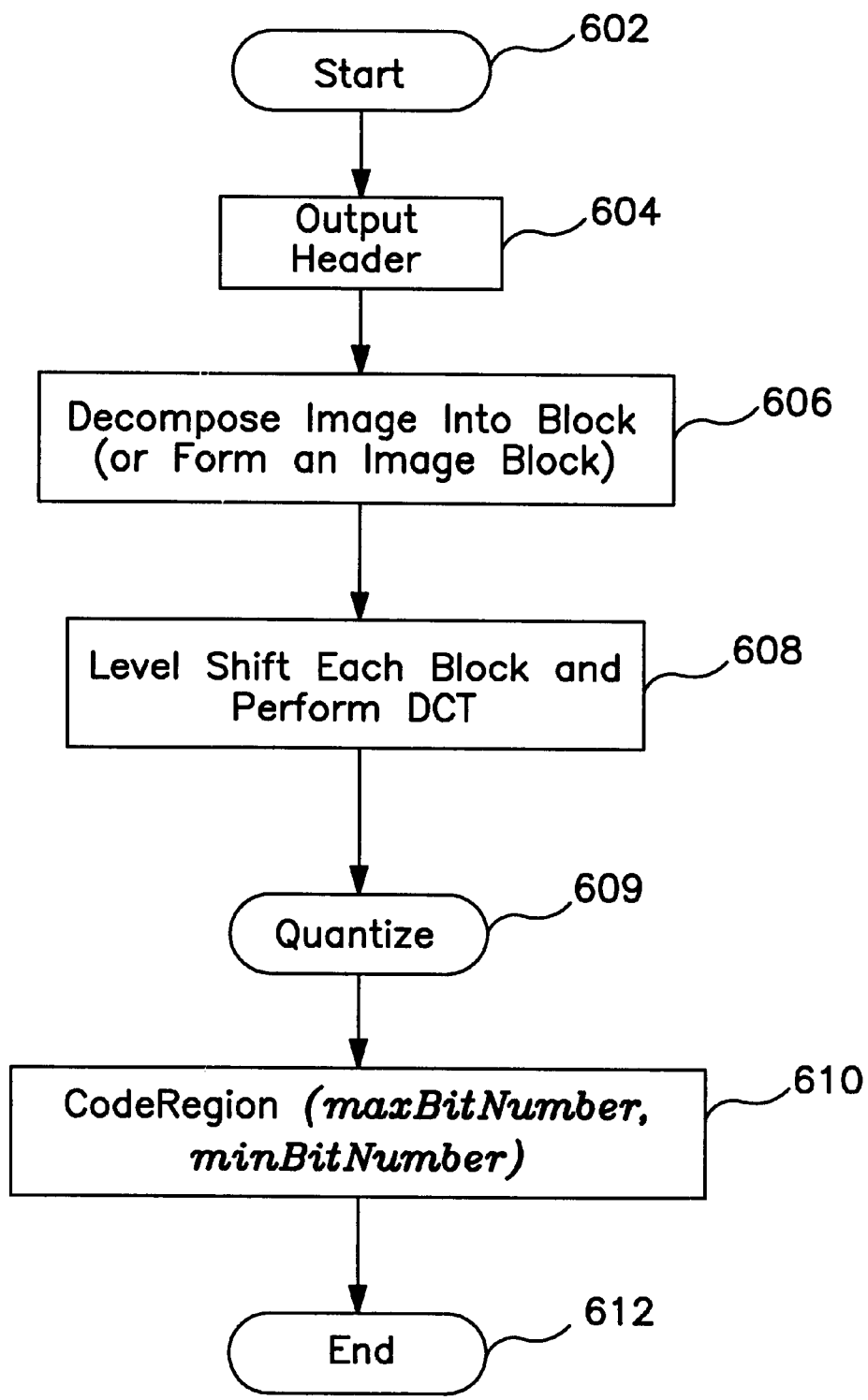
FIGS. 6 and 7 are flow diagrams illustrating in more detail the method of encoding an image shown in FIG. 2.

FIG. 6 is a flow diagram illustrating the block-based encoding process. Processing commences at step 602. In step 604, a header is output. This information preferably includes the image height and width and optionally the two coding parameters maxBitNumber and minBitNumber. Further header information may be used depending upon the application.

The coding parameter maxBitNumber can be selected in a variety of ways. If the 8×8 two dimensional DCT transform is performed on all image blocks prior to coding of any of them, the maxBitNumber can be closed to be the MSB number of the largest coefficient across all DCT blocks. For example, if the largest coefficient is 10000001 (decimal value 129), the maxBitNumber is set to 7 since the MSB is bit number 7. Alternately, a deterministic bound can be used which is determined by the resolution of the input image. The selection of this parameter can have a significant effect on compression. In some instances, more sophisticated ways of selecting maxBitNumber may be employed.

The parameter minBitNumber determines the compression ration versus quality trade off an can be varied. In the present embodiment minBitNumber is set to zero. This means that the quantised coefficients are coded losslessly.

In step 606, the image is decomposed into blocks (or an image block is formed) comprised of 8×8 pixels. The image is decomposed preferably into non-overlapping blocks. However, overlapping blocks may be employed. A block size of 8×8 pixels with a 2 dimensional discrete cosine transform can maintain good coding efficiency and memory localisation.

In step 608, each 8×8 block is level shifted and the discrete cosine transform (DCT) is performed. The image values are level shifted (for example, by 128 for an 8-bit image) to reduce or eliminate any undue mean bias, and each spatial block of the image is transformed. The DC coefficient difference is then decoded and added to the DC coefficient of the previous block.

In step 609, quantisation is performed utilizing a quantisation matrix as per the JPEG baseline standard.

In step 610, the 8×8 DCT block is coded using a subroutine CodeRegion having maxBitNumber, minBitNumber and T as parameters. Processing terminates in step 612.

Figure 7:
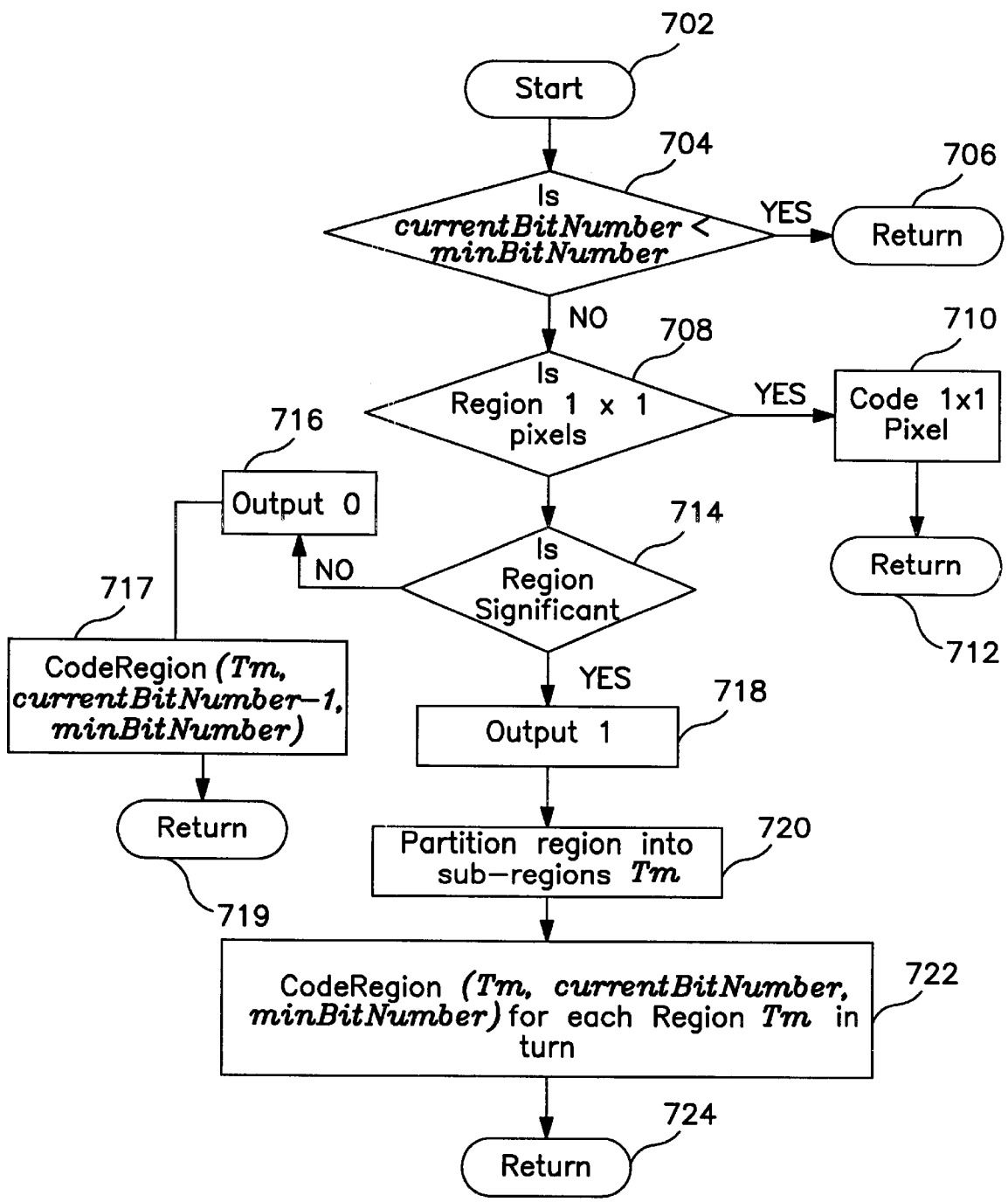

Step 610 for coding a block is illustrated in more detail in the flow diagram of FIG. 7. That is, FIG. 7 shows the subroutine CodeRegion using currentBitNumber, minBitNumber and T as parameters. The parameter T represents a region of DCT coefficients {cij} of the 8×8 DCT block. Preferably, the subroutine is implemented as a recursive technique where the subroutine process is able to call itself with a selected region. However, the process may be implemented in a non-recursive manner without departing from the scope and spirit of the invention.

In step 702, processing commences. Initially the selected region T is set to the whole of the 8×8 DCT block which will partitioned in a predetermined manner into smaller regions $T_m$ during the operation of the subroutine.

In decision block 704, a check is made to determined if the currentBitNumber is less than the minBitNumber. If decision block 704 returns true (yes), processing continues at step 706. In step 706, execution returns to the calling procedure. Otherwise, if decision block 704 returns false (no), processing continues at decision block 708.

In decision block 708 a check is made to determine if the region size of 1×1 pixels. If decision block 708 returns true (yes), processing continues at step 710. In step 710, the 1×1 pixel is coded. This involves outputting the bits between the currentBitNumber and the minBitNumber, inclusive, followed by a sign bit if necessary. Processing then returns to the calling procedure in step 712. Otherwise, if decision block 708 returns false (no), processing continues at decision block 714.

In decision block 714, a check is made to determine if the region is significant. If decision block 714 returns false (no), processing continues at step 716. In step 716, a zero (0) is output in the coded representation and a recursive call is made in step 717 to the subroutine CodeRegion(T, currentBitNumber-1, minBitnumber) where currentBitNumber has been decremented by one. Processing then returns the calling procedure in step 719. Otherwise, if decision block 714 returns true (yes), processing continues at step 718. Alternatively, to reduce the number of recursive function calls, the step 714 may be replaced by a step that outputs currentBitNumber-n zeros, where n is the largest integer for which T is significant. If n is not less than minBitNumber, the processing goes to step 718. Otherwise the function terminates.

To make the concept of region significance precise, a mathematical definition is given in Equation (1). At a given bit number, say currentBitNumber×n, the region T is said to be insignificant if:

$$|C_{ij}| \leq 2^n, \forall t, j \in T, \tag{5}$$

where T denotes the region, and cij denotes coefficient (i,j) in this region.

In step 718, a one (1) is output in the coded representation to indicate that the region is insignificant. In step 720, the selected region is partitioned in a predetermined manner into subregions ($T_m$), which is described with reference to FIG. 8. In step 722, each region $T_m$ in turn is coded using the parameters currentBitNumber and minBitNumber, by means of recursive call to the process of FIG. 7. In step 722 each subregion $T_m$ of the previous partition step is coded specifically with the same value of currentBitNumber. In step 724, execution returns to the calling procedure.

Figure 8:
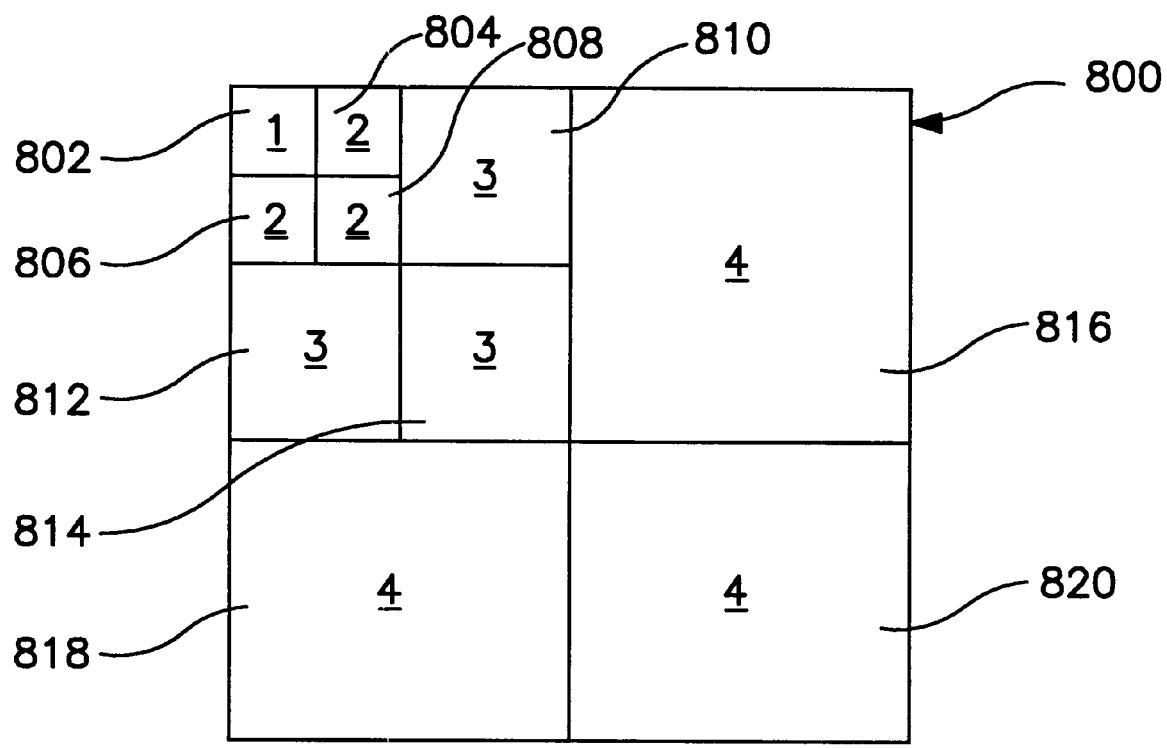
FIG. 8 is a block diagram illustrating the octave partitioning of a 8×8 two dimensional discrete cosine transform.

FIG. 8 is a block diagram illustrating the partitioning of a 8×8 block 800 of DCT coefficients. The 8×8 block 800 of DCT transform coefficients, arranged in the normal manner of increasing frequency, is partitioned in an octave manner.

The initial partitioning of the 8×8 DCT 800 is into two regions: a small region 802 (indicated with labelling as level 1) containing the DC coefficient, and another region containing all the remaining coefficients. When this latter region of sixty three coefficients is partitioned it is split into four regions: the three single pixel regions 804, 806 and 808 (ie. level 2), and a further region containing the remaining sixty coefficients. When this latter region is partitioned it is split into four more regions: the three regions 810, 812 and 814 (i.e., level 3) each consisting of 2×2 pixels, and a region containing the remaining forty eight coefficients. When this latter region is partitioned it is split into three regions 816, 818, and 820 (i.e., level 4) each consisting of 4×4 coefficients. The level 3 and 4 regions 810 to 820 are partitioned according to a quadtree partition. That is when a 4×4 region of coefficients is partitioned it is split about its middle into four regions, each consisting of 2×2 coefficients. And when a 2×2 region of coefficients is partitioned it is split into four regions each consisting of a single coefficient.

Thus, in the process of FIG. 7, a region of he 8×8 block is coded. The largest MSB number is isolated as before. If the region consists of only one pixel, it is coded as a single coefficient. Otherwise, a recursive call is made to Code Region() with its currentBitNumber decremented by one and a zero (0) is output in the coded representation until the currentBitNumber is less than the minBitNumber, or the region is significant. If the region is significant, a one (1) is output in the coded representation and the region is partitioned into further regions, and these are coded in turn. A single coefficient, for example the DC coefficient, is encoded by outputting the coefficient bits from the currentBitNumber to the minBitNumber inclusive. Again, the sign is preferably only output if some of the coefficient bits are non-zero.

In the coed representation, a transform coefficient is coded by simply outputting the pixel bits from the currentBitNumber to the minBitNumber. Preferably, a convention is followed whereby the sign is output only if some of the coefficient bits are non-zero. For example, if currentBitNumber×3, minBitNumber×1, and then —9 (00001001) is coded as "1 0 0" followed by a sign bit "1".

Example of Block Coding of DCT coefficients

The method effectively codes the leading zeros of most transform coefficients, while coding the bits from the most significant bit to the predetermined least significant bit, specified by the parameter minBitNumber, and the sign simply as is. Thus, the preferred embodiment of the present invention advantageously represents the leading zeros. This method is very efficient where the transform coefficients exhibit a large dynamic range. A few coefficients of an 8×8 DCT block typically have very large values, while most have very small values.

An example of Block Coding of DCT coefficients is described with reference to the following 8×8 DCT block. The processing of the initial region (8×8 coefficients) 1300 of FIG. 8 is commenced with the maxBitNumber set to 7 since this is the largest bit number (bitplane) of all the coefficients.

$$\begin{bmatrix} 200 & 13 & -11 & -8 & \cdots \\ -13 & 3 & -4 & -3 & \cdots \\ 8 & 1 & -2 & -2 & \cdots \\ 2 & -1 & -3 & -3 & \cdots \\ \cdots & \cdots & \cdots & \cdots & \cdots \end{bmatrix}$$

The minBitNumber is set to 3, for illustrative purposes. A header is preferably output in the coded representation containing maxBitNumber and minBitNumber. The process of coding the region 800 then follows.

At currentBitNumber=7, a one (1) is output since the region 800 is significant with respect to bit number 7 (see decision block 704, 708, and 714 and step 718 of FIG. 7). The region 800 is then partitioned into two sub-regions (see step 720 of FIG. 7): the top left region 802 and the remaining sixty three coefficients.

The region 802 and the remaining region of 63 coefficients are in turn coded in step 722 shown in FIG. 7. The subregion 1302 is coded first and the decimal value 200 is coded by outputting the bits from currentBitNumber=7 to the MinBitNumber=3 (see decision block 708 and 710 of FIG. 7). A sign bit of 0 is then output. Thus, the decimal value of 200 is coded as 11001 followed by the sign bit 0. The coded representation of this coefficient includes the one "1" bit preceeding the bits of the coefficient "200" between the CurrentBitNumber and minBitNumber. This completes the coding of the top left region 1302.

$$\underline{1\underline{11001}}\overset{sign\,bit}{0}$$
$$200$$

The header information is not shown in the foregoing expression.

The remaining region of sixty three coefficients 804 is then coded (step 722). A zero (0) is output for each of currentBitNumber equal to 7, 6, 5, and 4, since the remaining region is insignificant with respect to these bit numbers. A one (1) is output at currentBitNumber=3 (step 718), since this bitplane is significant with respect to bit number 3. In particular, the coefficients −13, 13, −11 and −8 have a MSB at bit number 3. The remaining region of sixty three coefficients is then partitioned (step 720) into three regions 804, 806 and 808 each consisting of one coefficient and a remaining region of sixty coefficients. These regions are each coded in turn beginning with regions 804, 806 and 808. As each of the latter regions are 1×1 pixels, each of these pixels is coded by outputting the bits of each coefficient from the currentBitNumber=3 to the minBitNumber=3. Thus the decimal value −13 is coded as 1 (with a sign bit 1). The decimal value 3 is coded as 0 (no sign bit is needed since it is coded (quantised) to zero). The decimal value 13 is coded as 1 (with a sign bit 0). Thus, at this stage, the coded representation is as follows:

1 110010 00001 11 0 10

200           -13 3 13

The regions 802, 804, 806 and 808 are thus encoded and the subsequent remaining regions can then be encoded and so on.

Block Decoding of DCT Coefficients

The decoding process for the alternate embodiment can be implemented by reversing the coding process described with reference to FIGS. 6 and 7.

Figure 9:
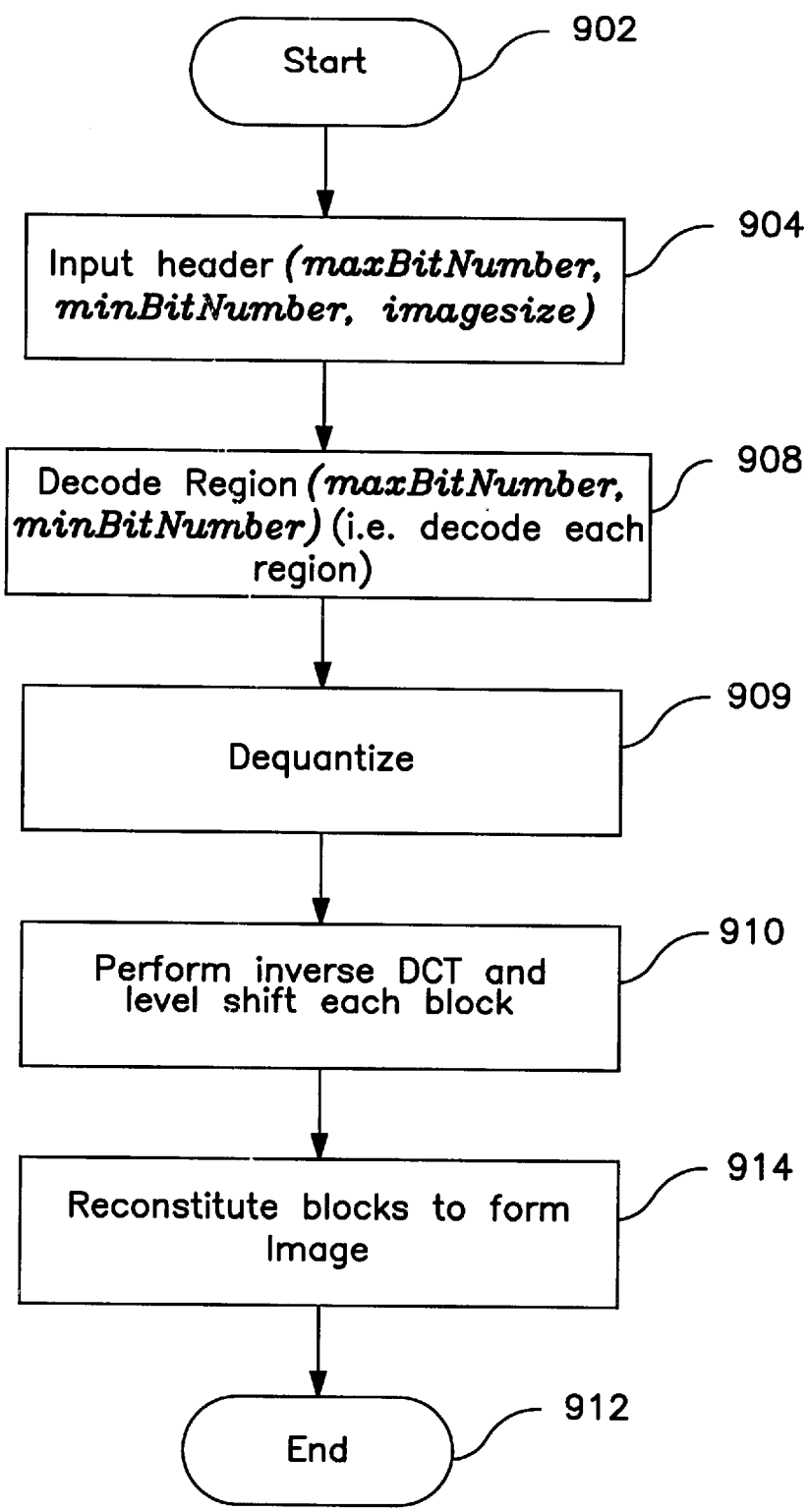
FIG. 9 is a flow diagram illustrating the method of decoding a coded representation of an image produced in accordance with the method FIG. 3.

FIG. 9 is a flow diagram illustrating a method of decoding the coded representation of an image obtained using the process of FIGS. 6 and 7. In step 902, processing commences using the coded representation. In step 904, the header information is read from the coded representation to determine the size of the original image. Also, information such as maxBitNumber (equal to the initial currentBitNumber in the coding process) and minBitNumber. Alternatively, the latter two parameters may be predetermined and stored at the decoder.

In step 908, each 8×8 block of coefficients is decoded using the function DeCodeRegion () having T, maxBitNumber and minBitNumber as parameters. In step 909, the resultant decoded block of 8×8 DCT coefficients are dequantised. In step 910, the inverse discrete cosine transform is applied to the decoded image block and level shifted. In step 914, the original image is reconstituted by recombining the transformed 8×8 blocks of pixels. Processing terminates in step 912.

Figure 10:
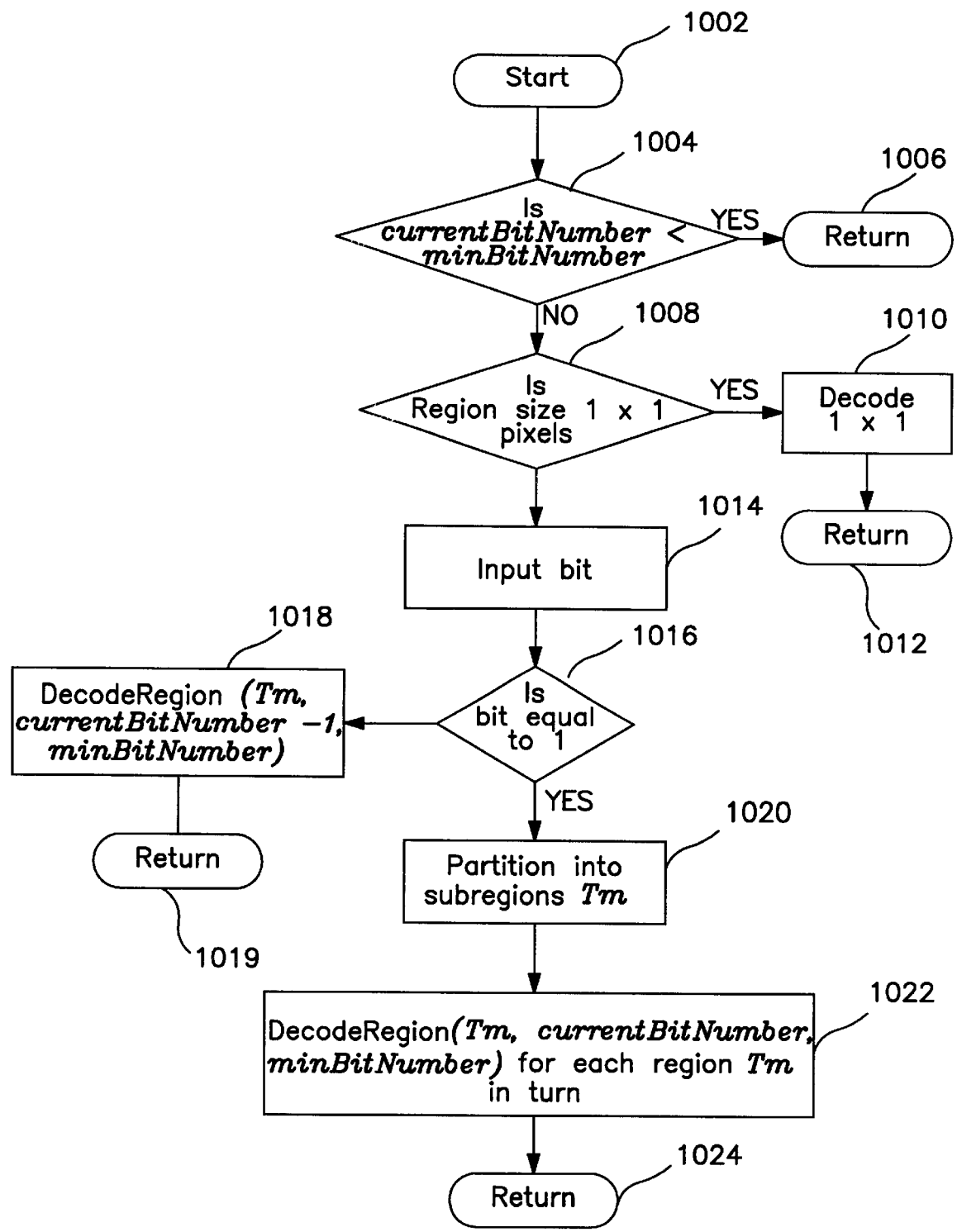
FIG. 10 is a detailed flow diagram illustrating the step of decoding shown in FIG. 9.

FIG. 10 is a detailed flow diagram of step 908 in FIG. 9 for decoding each region using procedure call "DeCodeRegion(T. currentBitNumber, minBitNumber)", where maxBitNumber is initially provided as the currentBitNumber, and where the whole 8×8 DCT block is selected as the region, T. In step 1002, processing commences. The inputs to the region decoding process of FIG. 10 are a region T. currentBitNumber and minBitNumber parameters. Again, the method is preferably implemented as a recursive technique. However, the process maybe implemented in a non-recursive manner without departing from the scope and spirit of the invention.

In decision block 1004, a check is made to determine if the currentBitNumber is less than the minBitNumber If decision block 1004 returns true (yes), processing continues at step 1006, where processing returns to the calling procedure. Otherwise, if decision block 1004 returns false (no), processing continues at decision block 1008.

In decision block 1008, a check is made to determine if the selected region has a size of 1×1 pixels. If decision block 1008 returns true (yes), processing continues at step 1010. In step 1010, the 1×1 region is decoded. This involves inputting a number of bits, the number of which corresponds to the difference between the currentBitNumber+1 and the minBitNumber, followed by a sign bit. The decimal value is then decoded by multiplying the inputted binary number by $2^{minBitNumber}$. Processing then returns to the calling procedure in step 1012. If decision block 1008 returns false (no), processing continues at step 1014. In step 1014, a bit is input from the coded representation.

In decision block 1016, a check is made to determine if the bit is equal to 1, that is, the input is checked to determine if the region is significant. If decision block 1016 returns false (no), processing continues at step 1018. In step 1018, a recursive call is made to DeCodeRegion() with its currentBitNumber decremented by one, after which the processing returns to the calling procedure in step 1019. Otherwise, if decision block 1016 returns true (yes), processing continues at step 1020. In step 1020, the region is partitioned in the same predetermined manner as the encoding process as shown with respect to FIGS. 7 and 8. In step 1022, each of the partitioned regions is decoded by recursively calling DeCodeRegion() using the currentBitNumber and minBitNumber. The partitioned regions are decoded in the same order as in the encoding process. In step 1024, processing returns to the calling procedure.

Thus, the bits output from the significance decisions in the encoder instruct the decoder on which path of the process to take, thus mimicking the encoder. The pixels, and possibly the sign bit, are decoded by simply reading in the appropriate number of bits (currentBitNumber to minBitNumber and if some of these are non-zero the sign bit).

Further Alternate Quantisation Methods Third Embodiment of Quantisation Method

In this embodiment the block based coding process 202 can be used to simultaneously quantise and code the coefficients. This is achieved by setting a minimum bit precision, i.e., minBitNumber to an integer greater than zero. The unquantised transform coefficients are then coded with the CodeRegion function. Thus, at step 704, instead of returning if currentBitNumber<0 we return if currentBitNumber<minBitNumber (which is a positive integer). At step 710 we output the coefficient bits currentBitNumber, currentBitNumber −1, . . . minBitNumber only (and a sign bit only if one of these bits is non-zero). Using the CodeRegion function in this way we represent each coefficient in T to a precision of $2^{minBitNumber}$ (or to a bit precision of minBitNumber). For dequantisation, we reconstruct the coefficient magnitude according to the bits currentBitNumber, currentBitNumber −1, . . . minBitNumber. If the coefficient is non-zero we then add $2^{minBitNumber-1}$ to the magnitude of the coefficient. In this way the (non-zero) dequantised coefficients are reconstructed in the middle of the quantisation interval. This is equivalent to uniform quantisation with a step size of $2^{minBitNumber}$ and a deadzone. Namely this is equivalent to the second quantisation method described above. However in the present embodiment, the block based DCT process 202 simultaneously performs the quantising and coding and hence the quantising and dequantising steps 201, 609, 301 and 909 may be dispensed with. In this embodiment, prior to the simultaneous coding and quantisation steps, the coefficients of the 8×8 DCT block are scaled by a scaling matrix. The combination of the scaling matrix and quantisation are such that they are similar in effect to the quantisation matrix of the JPEG baseline standard.

Fourth Embodiments of Quantisation Method

In a further more efficient form of quantisation, the transform coefficients are coded with the modified CodeRegion function described above. However, in addition, at step 710 of the CodeRegion function we add $2^{minBitNumber-1}$ to the magnitude of the coefficient, before outputting the coefficient bits currentBitNumber, . . . minBitNumber inclusive if by doing so the most significant bit number of the coefficient does not exceed currentBitNumber. The decoder decodes the bits currentBitNumber, currentBitNumber −1, . . . , minBitNumber reconstructing (dequantising) the magnitude of the coefficient exactly as specified by these bits.

As an example let minBitNumber=3 and suppose currentBitNumber=3 at step 710 of the modified CodeRegion function. Then if the coefficient x=7 we add $2^{minBitNumber-1}$=4 to x to give x=11 (since the most significant bit number of 11 is 3, which does not exceed currentBitNumber=3). We then output bit 3 of 11, which is 1. Since this is non-zero and x is positive we output a sign bit 0 (indicating x is positive). On the other hand if the original coefficient x=15, then we do not add $2^{minBitNumber-1}$=4 to x since the most significant bit number of $x+2^{minBitNumber-1}$(15+4=19) would be 4 which is greater than currentBitNumber=3. Thus 15 is coded by outputting a 1 bit (bit 3 or 15) and a 0 bit to indicate a positive coefficient. Both 7 and 15 are decoded as 8.

This fourth embodiment also utilises a scaling matrix in a similar manner to that of the third embodiment described above.

The fourth embodiment of quantisation, is more efficient in a rate distortion sense than uniform quantisation and uniform quantisation with a dead-zone.

Transcoding

The methods of transcoding described with reference to FIGS. 4 and 5 differs from the JPEG method only in the lossless coding of the quantised coefficients. By lossless we mean that the coding is reversible. That is we can encode the coefficients using the disclosed method and then decode to produce the same quantised coefficients. The same is true of the corresponding coding process in JPEG. Thus we can decode from one format to the other and back without loss.

For example to transcode from a JPEG compressed image, we partially decompress a JPEG image to give 8×8 blocks of quantised DCT transform coefficients. These coefficients are then coded according to the block based encoding method disclosed here. To transcode back to JPEG we decode to give the 8×8 blocks of quantised DCT coefficients. These can then be coded with the JPEG quantisation index coding method. The output JPEG compressed file will then be identical to the original JPEG file (assuming the header and auxiliary information remains the same).

In the same manner an image originally compressed with the disclosed method can be transcoded to a JPEG format and back without loss.

As mentioned previously, using quantisation with a deadzone generally improves the rate distortion performances of image compressors. However, if the uniform quantisation with a deadzone outlined in the section entitled "Second Embodiment of Quantisation" is employed with the block-based DCT encoding method described herein, and if we transcode to JPEG, the quality of the image directly decoded by a JPEG decoder will not be optimum. This is due to the fact that the JPEG decoder will be using dequantisation of the form of equation (2) while the optimum dequantisation is of the form of equation (4). However, if the quantisation described in the section entitled "Fourth Embodiment of Quantisation" is used by the block-based DCT encoding method described herein, then the effective optimum dequantisation is of the form of equation (2). Hence there will be no loss in transcoding to JPEG, and then using a JPEG decoder to decode the image. This form of quantisation thus has the advantage of better rate distortion performances with the block-based DCT encoder, and offering no loss in transcoding to a JPEG format, with subsequent JPEG decoding.

The embodiments of the invention provide methods and apparatuses for representing digital image data in an efficient and flexible manner, in which the representation is suitable for storing and/or transmitting images. The encoding techniques can be used generally to represent an array of transform coefficients, and to provide an efficient representation by representing an image in the discrete cosine transform domain. In particular, the embodiments provide methods and apparatuses for representing (or coding) leading zeros of blocks of transform coefficients obtained from an input image. The techniques are efficient in terms of offering a good reproduction of the original image for a given size code and offering fast decoding. Further, the techniques are flexible in that coefficients obtained from a linear transformation are encoded independently without the use of entropy coding. The advantageous aspects of the embodiment include the quantisation nature of the coding and the ability to transcode to JPEG without loss.

The foregoing only describes a small number of embodiments of the present invention, however, modifications and/or changes can be made thereto by a person skilled in the art without departing from the scope and spirit of the invention. For example, in the foregoing description, the embodiments of the invention have been described with reference to a final subregion having a predetermined size of 1×1 coefficient. However, it will be apparent to one skilled in the art that a different size may be practiced without departing from the scope and spirit of the invention. The embodiments of the invention may be practiced with 2×2 coefficients, for instance.

What is claimed is:

1. A method of representing a digital image to provide a coded representation, said method including the steps of:
    (a) dividing said digital image into a number of blocks of pixels;
    (b) transforming each block of pixels to derive a block of transform coefficients, each transform coefficient represented by a predefined bit sequence;
    (c) selecting each block of transform coefficients in turn as a region and setting a predetermined maximum bit plane as the current bit plane;
    (d) scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined significant bitplane as the current bitplane;
    (e) partitioning said selected region into two or more subregions having a predetermined form, and setting each of said subregions as said selected region; and
    (f) repeating steps (d) and (e) for each selected region in turn, commencing from said current bit plane until the predetermined minimum bitplane has been reached, or said selected region has a predetermined size, and coding said transform coefficients of said selected region and providing said coded transform coefficients in said coded representation.

2. An apparatus for representing a digital image to provide a coded representation, said apparatus including:
    means for dividing said digital image into a number of blocks of pixels;
    means for transforming each block of pixels to derive a block of transform coefficients, each coefficient represented by a predefined bit sequence;
    means for selecting each block of transform coefficients in turn as a region and setting a predetermined maximum bitplane as the current bitplane;
    means for scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined bitplane as the current bitplane;
    means for partitioning said selected region into two or more subregions having a predetermined form, and setting each of said subregions as said selected region; and
    means for controlling said scanning means and said partitioning means to carry out respective functioning of said scanning and partitioning means commencing from said current bitplane until the predetermined minimum bitplane has been reached, or said selected region has a predetermined size, and for coding said transform coefficients of said selected region and providing said coded transform coefficients in said coded representation.

3. A computer program product including a computer readable medium having recorded thereon a computer program for representing a digital image to provide a coded representation, said computer program product including:
    means for dividing said digital image into a number of blocks of pixels;
    means for transforming each block of pixels to derive a block of transform coefficients, each coefficient represented by a predefined bit sequence;
    means for selecting each block of transform coefficients in turn as a region and setting a predetermined maximum bitplane as the current bitplane;
    means for scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined bitplane as the current bitplane;
    means for partitioning said selected region into two or more subregions having a predetermined form, and setting each of said subregions as said selected region; and
    means for controlling said scanning means and said partitioning means to carry out respective functioning of said scanning and partitioning means commencing from said current bitplane until the predetermined minimum bitplane has been reached, or said selected region has a predetermined size, and for coding said transform coefficients of said selected region and providing said coded transform coefficients in said coded representation.

4. A method for decoding a coded representation of a digital image consisting of a number of blocks of pixels having associated therewith blocks of transform coefficients, said method including the steps of:

(a) selecting each block of transform coefficients as a region;

(b) scanning said coded representation associated with said selected region, said coded representation including a first token for each insignificant bitplane of said coefficients, a second token for each significant bitplane of said coefficients, and zero or more coded coefficients;

(c) if a first token is determined, providing an insignificant bitplane in an output stream for a current bitplane of coefficients of said selected region;

(d) if a second token is determined, providing a significant bitplane in said output stream for said current bitplane of said coefficients of said selected region and partitioning said selected region into two or more subregions having a predetermined form, and setting each of said subregions as said selected region;

(e) repeating steps (b) to (d) commencing from a predetermined bitplane until a predetermined minimum bit plane has been reached, or until said selected region has a predetermined size wherein a coded transform coefficient of said selected region is decoded and provided in an output block of transform coefficients;

(f) inverse transforming each said output block of transform coefficients to derive a said block of pixels; and (g) combining said blocks of pixels to reconstitute the digital image.

5. An apparatus for decoding a coded representation of a digital image consisting of a number of blocks of pixels having associated therewith blocks of transform coefficients, said apparatus including:

means for selecting each block of transform of coefficients as a region;

means for scanning said coded representation of said selected region, said coded representation including a first token for each insignificant bitplane of said coefficients, a second token for each significant bitplane of said coefficients, and zero or more coded coefficients;

means for, if a first token is determined, providing an insignificant bitplane in an output stream for a current bitplane of coefficients of said selected region;

means for, if a second token is determined, providing a significant bitplane in said output stream for said current bitplane of said coefficients of said selected region and partitioning said selected region into two or more subregions having a predetermined form, and setting each of said subregions as said selected regions;

means for controlling said scanning means, said means for providing said insignificant bitplane, and means for providing said significant bitplane commencing from a predetermined bitplane until a predetermined minimum bit plane has been reached, or until said selected region has a predetermined size wherein a coded coefficient of said selected region is decoded and provided in an output block of transform coefficients;

means for inverse transforming each said output block of transform coefficients to derive a said block of pixels; and means for combining said blocks of pixels to reconstitute the digital image.

6. A computer program product including a computer readable medium having recorded thereon a computer program for decoding a coded representation of a digital image, said computer program product comprising:

means for selecting each block of transform coefficients as a region;

means for scanning said coded representation of said selected region, said coded representation including a first token for each insignificant bitplane of said coefficients, a second token for each significant bitplane of said coefficients, and zero or more coded coefficients;

means for, if a first token is determined, providing an insignificant bitplane in an output stream for a current bitplane of coefficients of said selected region;

means for, if a second token is determined, providing a significant bitplane in said output stream for said current bitplane of said coefficients of said selected region and partitioning said selected region into two or more subregions having a predetermined form, and setting each of said subregions as said selected region;

means for controlling said scanning means, said means for providing said insignificant bitplane, and said means for providing said significant bitplane commencing from a predetermined bitplane until a predetermined minimum bit plane has been reached, or until said selected region has a predetermined size wherein a coded coefficient of said selected region is decoded and provided in an output block of transform coefficients;

means for inverse transforming each said output block of transform coefficients to derive a said block of pixels; and means for combining said blocks of pixels to reconstitute the digital image.

7. A method of transcoding a JPEG encoded digital image to provide a coded representation in another format, said method including the following steps:

(a) entropy decoding the JPEG digital image to generate blocks of quantised transform coefficients;

(b) selecting each block of transform coefficients in turn as a region and setting a predetermined maximum bit plane as the current bit plane;

(c) scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined significant bitplane as the current bitplane;

(d) partitioning said selected region into two or more subregions having a predetermined form, and setting each of said subregions as said selected region; and (e) repeating steps (c) and (d) for each selected region in turn, commencing from said current bit plane until the predetermined minimum bitplane has been reached, or said selected region has a predetermined size, and coding said transform coefficients of said selected region and providing said coded transform coefficients in said coded representation.

8. An apparatus for transcoding a JPEG encoded digital image to provide a coded representation in another format, said apparatus including:

means for entropy decoding the JPEG digital image to generate blocks of quantised transform coefficients;

means for selecting each block of transform coefficients in turn as a region and setting a predetermined maximum bitplane as the current bitplane;

means for scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined bitplane as the current bitplane;

means for partitioning said selected region into two or more subregions having a predetermined for, and setting each of said subregions as said selected region; and means for controlling said scanning means and said partitioning means to carry out respective functioning of said scanning and partitioning means commencing from said current bitplane until the predetermined minimum bitplane has been reached, or said selected region has a predetermined size, and for coding said transform coefficients of said selected region and providing said coded transform coefficients in said coded representation.

9. A computer program product including a computer readable medium having recorded thereon a computer program for transcoding a JPEG encoded digital image to provide a coded representation in another format, said computer program product including:

means for entropy decoding the JPEG digital image to generate blocks of quantised transform coefficients;

means for selecting each block of transform coefficients in turn as a region and setting a predetermined maximum bitplane as the current bitplane;

means for scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined bitplane as the current bitplane;

means for partitioning said selected region into two or more subregions having a predetermined form, and setting each of said subregions as said selected region; and means for controlling said scanning means and said partitioning means to carry out respective functioning of said scanning and partitioning means commencing from said current bitplane until the predetermined minimum bitplane has been reached, or said selected region has a predetermined size, and for coding said transform coefficients of said selected region and providing said coded transform coefficients in said coded representation.

10. A method of transcoding a coded representation of a digital image consisting of a number of blocks of pixels having associated therewith blocks of transform coefficients to a JPEG encoded image, said method including the following steps:

(a) selecting a block of transform coefficients as a region;

(b) scanning said coded representation associated with said selected region, said coded representation including a first token for each insignificant bitplane of said coefficients, a second token for each significant bitplane of said coefficients, and zero or more coded coefficients;

(c) if a first token is determined, providing an insignificant bitplane in an output stream for a current bitplane of coefficients of said selected region;

(d) if a second token is determined, providing a significant bitplane in said output stream for said current bitplane of said coefficients of said selected region and partitioning said selected region into two or more subregions having a predetermined form, and setting each of said subregions as said selected region;

(e) repeating steps (b) to (d) commencing from a predetermined bitplane until a predetermined minimum bit plane has been reached, or until said selected region has a predetermined size wherein a coded transform coefficient of said selected region is decoded and provided in an output block of transform coefficients; and (f) entropy coding each said output block of transform coefficients to derive said JPEG encoded image.

11. An apparatus for transcoding a coded representation of a digital image consisting of a number of blocks of pixels having associated therewith blocks of transform coefficients to a JPEG encoded image, said apparatus including:

means for selecting a block of transform coefficients as a region;

means for scanning said coded representation associated with said selected region, said coded representation including a first token for each insignificant bitplane of said coefficients, a second token for each significant bitplane of said coefficients, and zero or more coded coefficients;

means for, if a first token is determined, provided an insignificant bitplane in an output stream for a current bitplane of coefficients of said selected region;

means for, if a second token is determined, providing a significant bitplane in said output stream for said current bitplane of said coefficients of said selected region and partitioning said selected region into two or more subregions having a predetermined form, and setting each of said subregions as said selected region;

means for controlling said scanning means, said means for providing said insignificant bitplane, and said means for providing said significant bitplane commencing from a predetermined bitplane until a predetermined minimum bit plane has been reached, or until said selected region has a predetermined size wherein a coded coefficient of said selected region is decoded and provided in an output block of transform coefficients; and means for entropy coding each said output block of transform coefficients to derive said JPEG encoded image.

12. A computer program product including a computer readable medium having recorded thereon a computer program four transcoding a coded representation of a digital image consisting of a number of blocks of pixels having associated therewith blocks of transform coefficients to a JPEG encoded image, said computer program product including:

means for selecting a block of transform coefficients as a region;

means for scanning said coded representation associated with said selected region, said coded representation including a first token for each insignificant bitplane of said coefficients, a second token for each significant bitplane of said coefficients, and zero or more coded coefficients;

means for, if a first token is determined, providing an insignificant bitplane in an output stream for a current bitplane of coefficients of said selected region;

means for, if a second token is determined, providing a significant bitplane in said output stream for said current bitplane of said coefficients of said selected region and partitioning said selected region into two or more subregions having a predetermined form, and setting each of said subregions as said selected region;

means for controlling said scanning means, said means for providing said insignificant bitplane, and said means for providing said significant bitplane commencing from a predetermined bitplane until a predetermined minimum bit plane has been reached, or until said selected region has a predetermined size wherein a coded coefficient of said selected region is decoded and provided in an output block of transform coefficients; and means for entropy coding each said output block of transform coefficients to derive said JPEG encoded image.

13. A method of representing a digital image to provide a coded binary representation, said method including the steps of:

(a) dividing said digital image into a number of blocks of pixels;

(b) transforming each block of pixels to derive a block of transform coefficients, each transform coefficient represented by a predefined bit sequence;

(c) selecting each block of transform coefficients in turn as a region and setting a predetermined significant bit plane as the current bit plane;

(d) scanning the significance of each bitplane of said selected region from the current bit plane towards a predetermined minimum bitplane, and providing a first token for each insignificant bitplane and a second token for a significant bitplane in said coded binary representation until a significant bitplane is determined and setting said determined significant bit plane as the current bit plane;

(e) partitioning said selected region into two or more subregions having a predetermined form, and setting each of said subregions as said selected region;

(f) repeating steps (d) and (e) for each selected region in turn, commencing from said current bit plane until the predetermined minimum bit plane has been reached, or said selected region has only one transform coefficient and in the event of the latter coding said one transform coefficient by performing the following steps:

(i) summing the magnitude of said one transform coefficient and $2^{minBitNumber}$; and (ii) outputting a bit sequence from currentBitNumber to minBitNumber inclusive of said sum, if by doing so the most significant bit of said sum does not exceed the currentBitNumber, otherwise outputting a bit sequence from the currentBitNumber to the minBitNumber inclusive of said one transform coefficient, wherein the minimum bit plane has a bit number minBitNumber which is an integer greater than zero and the current bitplane has a bit number currentBitNumber.

* * * * *

UNITED STATES PATENT AND TRADEMARK OFFICE
CERTIFICATE OF CORRECTION

PATENT NO. : 6,351,568 B1
DATED : February 26, 2002
INVENTOR(S) : James Philip Andrew It is certified that error appears in the above-identified patent and that said Letters Patent is hereby corrected as shown below:

Column 3,
Line 10, "provided" should read -- providing --; and
Line 32, "transform of" should read -- transform --.

Column 6,
Line 7, "and" should read -- to --; and
Line 48, "According" should read -- ¶ According --.

Column 8,
Line 50, "modern" should read -- modem --.

Column 10,
Line 51, "later" should read -- latter --.

Column 11,
Line 27, Coefficients provides a better rate" should read -- coefficients provides a better rate --;
Line 52, "largest" should read -- largest integer --; and
Line 66, "Second" should read -- ¶ Second --.

Column 12,
Line 33, "and" should read -- an --;
Line 45, "number" should read -- numbers --; and
Line 51, "simplicity" should read -- implicitly --.

Column 13,
Line 19, "an" should read -- and --; and
Line 52, "will" should read -- will be --.

Column 15,
Line 6, "coed" should read -- coded --; and
Line 11, "currentBitNumberX3, minBitNumberX1," should read
-- currentBitNumber = 3, minBitNumber = 1, --.

UNITED STATES PATENT AND TRADEMARK OFFICE
CERTIFICATE OF CORRECTION

PATENT NO. : 6,351,568 B1
DATED : February 26, 2002
INVENTOR(S) : James Philip Andrew It is certified that error appears in the above-identified patent and that said Letters Patent is hereby corrected as shown below:

Column 16,
Line 51, ""DeCodeRegion(T." should read -- "DeCodeRegion(T, --; and
Line 57, "T." should read -- T, --.

Column 24,
Line 25, "provided" should read -- providing --; and
Line 49, "four" should read -- for --.

Signed and Sealed this

First Day of October, 2002

Attest:

Attesting Officer

JAMES E. ROGAN
*Director of the United States Patent and Trademark Office*